US012617107B2

(12) United States Patent
Douglas

(10) Patent No.: US 12,617,107 B2
(45) Date of Patent: May 5, 2026

(54) LOCKING FOLDABLE KNIFE

(71) Applicant: Good Sportsman Marketing, LLC, Irving, TX (US)

(72) Inventor: Dillon Douglas, Henderson, NV (US)

(73) Assignee: GOOD SPORTSMAN MARKETING, LLC, Irving, TX (US)

(*) Notice: Subject to any disclaimer, the term of this patent is extended or adjusted under 35 U.S.C. 154(b) by 62 days.

(21) Appl. No.: 18/538,788

(22) Filed: Dec. 13, 2023

(65) Prior Publication Data

US 2024/0149477 A1 May 9, 2024

Related U.S. Application Data

(63) Continuation of application No. 17/567,825, filed on Jan. 3, 2022, now Pat. No. 11,883,967.

(60) Provisional application No. 63/161,911, filed on Mar. 16, 2021.

(51) Int. Cl.
*B26B 1/04* (2006.01)

(52) U.S. Cl.
CPC .................................... *B26B 1/048* (2013.01)

(58) Field of Classification Search
CPC .... B26B 1/00; B26B 1/02; B26B 1/04; B26B 1/048
See application file for complete search history.

(56) References Cited

U.S. PATENT DOCUMENTS

| | | | | |
|---|---|---|---|---|
| 4,451,982 | A | 6/1984 | Collins | |
| 5,737,841 | A | 4/1998 | McHenry et al. | |
| 6,145,202 | A | 11/2000 | Onion | |
| 6,378,214 | B1 | 4/2002 | Onion | |
| 6,751,868 | B2 | 6/2004 | Glesser | |
| 7,059,053 | B2 | 6/2006 | Sakai | |
| 7,062,856 | B2 | 6/2006 | Moser | |
| 7,340,837 | B1 | 3/2008 | Busse | |
| 7,469,476 | B2 * | 12/2008 | Demko | B26B 1/042 30/160 |
| 7,581,321 | B2 | 9/2009 | Kain | |
| 7,941,927 | B1 | 5/2011 | Demko | |
| 8,458,913 | B2 * | 6/2013 | Lo | B26B 1/044 30/159 |
| 9,327,413 | B2 | 5/2016 | Sakai | |
| 9,751,221 | B1 | 9/2017 | Aylsworth | |
| 9,751,222 | B2 | 9/2017 | Kao | |
| 10,160,122 | B2 | 12/2018 | Busse | |
| 10,307,916 | B2 | 6/2019 | Hinderer | |
| 10,632,632 | B1 | 4/2020 | Demko | |

(Continued)

OTHER PUBLICATIONS

Notice of Allowance in U.S. Appl. No. 17/901,178 mailed Sep. 18, 2025, 11-pgs.

*Primary Examiner* — Boyer D Ashley
*Assistant Examiner* — Richard D Crosby, Jr.
(74) *Attorney, Agent, or Firm* — Cabello Hall & Zinda, PLLC

(57) ABSTRACT

A locking foldable knife includes a locking assembly that reliably locks a blade in an extended position for use. The locking assembly utilizes the surface area of a shaped peripheral edge at a second end of the blade, together with, confirming structures of a locking bar, and one or more stops to reliably lock the blade in the extended position. The locking assembly can also lock the blade in a folded position in one or more configurations of the locking foldable knife.

28 Claims, 7 Drawing Sheets

(56) References Cited

U.S. PATENT DOCUMENTS

| | | | |
|---|---|---|---|
| 10,792,823 B2 | 10/2020 | Busse | |
| 11,130,246 B2 | 9/2021 | Busse | |
| 11,220,013 B1 | 1/2022 | Valerio | |
| 11,298,837 B2 | 4/2022 | Hangartner | |
| 2008/0040931 A1 | 2/2008 | Demko | |
| 2010/0192381 A1 | 8/2010 | Sakai | |
| 2012/0159789 A9 * | 6/2012 | Frazer | B26B 1/042 30/155 |
| 2015/0239134 A1 | 8/2015 | Duey | |
| 2016/0121493 A1 | 5/2016 | Ikoma | |
| 2016/0354936 A1 | 12/2016 | Busse et al. | |

* cited by examiner

LOCKING FOLDABLE KNIFE

CROSS-REFERENCE TO RELATED APPLICATION

This application is a continuation of U.S. application Ser. No. 17/567,825 filed Jan. 3, 2022, which claims the benefit of U.S. Provisional Application No. 63/161,911, filed Mar. 16, 2021—both of which are incorporated herein by reference in their entireties.

BACKGROUND OF THE INVENTION

Field of the Invention

The invention relates to folding knives and in particular to a locking foldable knife.

Related Art

Folding knives are often desirable because they provide a blade that can be extended for use and can be folded for storage and carrying. This provides convenience as well as utility. A variety of locking mechanisms have been developed to prevent the blade from folding while extended for use.

For example, U.S. Pat. Nos. 4,451,982 and 7,914,927 describe a sliding member that extends to engage and lock a blade in position. U.S. Pat. Nos. 6,761,868 and 5,737,841 describe a spherical or cylindrical member that slides to engage and lock a blade in position. U.S. Pat. No. 10,632,632 and U.S. Patent Publication No. 2008/0040931 describe a pivoting member that pivots to engage and lock a blade in position.

From the discussion that follows, it will become apparent that the present invention addresses the deficiencies associated with the prior art while providing numerous additional advantages and benefits not contemplated or possible with prior art constructions.

SUMMARY OF THE INVENTION

A locking foldable knife is disclosed herein. As will be described further below, the locking foldable knife reliably locks a blade in an extended position, a folded position, or both through its locking assembly. The locking assembly comprises a variety of shaped structures to provide the surface area to reliably lock a blade in position.

Various embodiments of a locking foldable knife are disclosed. For instance, in one exemplary embodiment, a locking foldable knife comprises a handle and a blade rotatably mounted to the handle at the blade's second end. The blade comprises a first end and a second end. The first end comprises one or more cutting edges and the second end has a shaped periphery. The shaped periphery has a plurality of locking edges and at least one interstitial edge therebetween;

A locking bar is slidable along an axis between an extended position and retracted position relative to the handle, and a stop is secured to the handle proximate a distal end of the locking bar and positioned along the axis. A portion of the locking bar at the distal end of the locking bar is received between at least one of the locking edges and the stop when the locking bar is in the extended position, and the locking bar is disengaged from the locking edges when the locking bar is in the retracted position.

The locking foldable knife may include a slot formed in the shaped periphery adjacent at least one of the locking edges. In addition, the portion of the locking bar may also be received in the slot when the locking bar is in the extended position. At least one of the locking edges may engage a locking edge of the locking bar when the blade is in a fully extended or fully retracted state.

The portion of the locking bar may be an outwardly extending tab. An additional tab may be formed at a distal end of the locking bar. In such embodiments, the stop may be received between the tab and the additional tab when the locking bar is in the extended position. An additional stop may also be secured to the handle and aligned with the stop along the axis.

In another exemplary embodiment, a locking assembly for a foldable knife having a handle and a blade is disclosed. The locking assembly comprises a proximal end of the blade that has a plurality of locking edges and an interstitial edge therebetween. The blade is rotatably mounted to the handle at the proximal end of the blade.

A locking bar is slidable along an axis between an extended position and retracted position relative to the handle, and a stop is secured to the handle proximate a distal end of the locking bar and positioned along the axis. A portion of the locking bar at the distal end of the locking bar is received between at least one of the locking edges and the stop when the locking bar is in the extended position, and the locking bar is disengaged from the locking edges when the locking bar is in the retracted position. The locking edges and the at least one interstitial edge may be distinct in shape.

A slot may be formed in the proximal end of the blade adjacent at least one of the locking edges. The portion of the locking bar may also be received in the slot when the locking bar is in the extended position.

At least one of the locking edges may engage a locking edge of the locking bar when the blade is in an extended or retracted state. In addition, at least an edge of the locking bar and the locking edges may have corresponding shapes. An additional stop may be secured to the handle and aligned with the stop along the axis as well. A biasing device may be provided to force the locking bar towards the extended position.

Various methods for a locking foldable knife are disclosed herein as well. For instance, in one exemplary embodiment, a method for providing a locking foldable knife comprises rotatably mounting a proximal end of a blade to a handle of the locking foldable knife. The proximal end of the blade comprises a plurality of straight edges and at least one curved edge therebetween.

A locking bar is slidably mounted to the handle and slidable along an axis between an extended position and retracted position, and a stop is attached to the handle proximate a distal end of the locking bar and positioned along the axis.

A portion of the locking bar at the distal end of the locking bar is received between at least one of the locking edges and the stop when the locking bar is in the extended position, and the locking bar is disengaged from the locking edges when the locking bar is in the retracted position.

A slot may be formed in the proximal end of the blade adjacent at least one of the locking edges. The portion of the locking bar may also be received in the slot when the locking bar is in the extended position. At least one of the locking edges may engage a locking edge of the locking bar when the blade is in an extended or retracted state. An additional stop may be attached to the handle and aligned with the stop along the axis.

The portion of the locking bar may be an outwardly extending tab. An additional tab may be formed at a distal end of the locking bar, such that the stop is received between the tab and the additional tab when the locking bar is in the extended position.

Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As will become apparent from the disclosure herein, the locking foldable knife provides a locking assembly to reliably lock its blade in position. The locking assembly reduces the risk of accidental closure while also maintaining the convenience of a folding knife.

Figure 1:
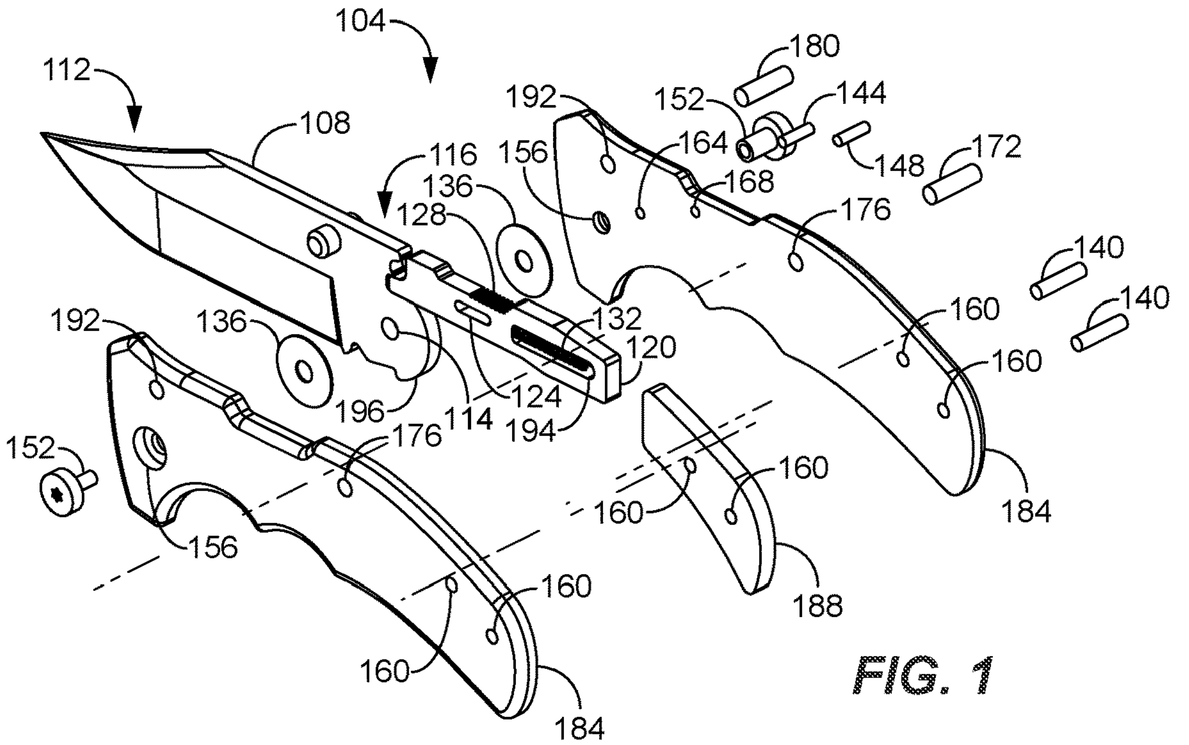
FIG. 1 is an exploded view of an exemplary locking foldable knife.

FIG. 1 illustrates an exploded view of an exemplary locking foldable knife 104. A locking foldable knife 104 will typically comprise a blade 108 having a first end 112 and a second end 116. In one or more embodiments, the first end 112 will typically comprise one or more cutting edges while the second end 116 typically comprises a shaped peripheral edge 196 for, among other things, locking the blade, as will be described further below.

Figure 2:
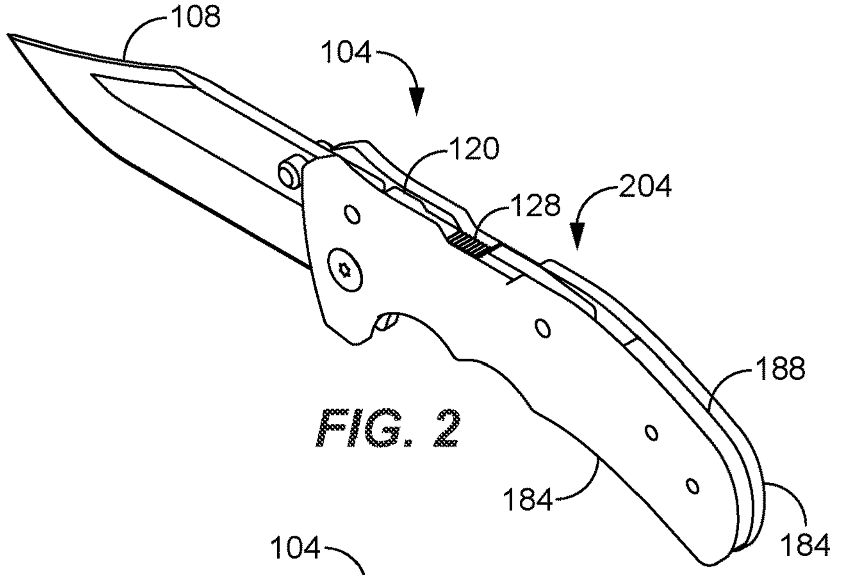
FIG. 2 is a perspective view of an exemplary locking foldable knife in an extended state.
Figure 3:
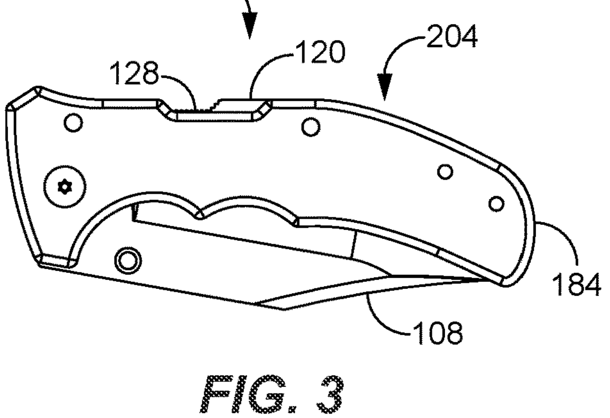
FIG. 3 is a side view of an exemplary locking foldable knife in a folded state.

Referring to FIGS. 2-3, it can be seen that the blade 108 may be secured to a handle 204 and extend and fold relative to the same. A handle 204 may comprise one or more portions 184, one or more handle spacers 188, or both. As shown in FIG. 1 for example, the handle 204 comprises a first and second portions 184 that form the lateral sides of the handle 204. It is noted that one or more portions of a handle 204 may be contoured, such as to form a hand grip, allow access to elements of the locking foldable knife 104, or both.

One or more fasteners 140 may be used to assemble the locking foldable knife 104. As shown in FIG. 1 for example, fasteners 140 comprising pins engage corresponding apertures 160 to assemble the locking foldable knife 104. Though shown as mechanical fasteners, it is contemplated that a fastener may also be one or more adhesives, welds, or the like.

A blade 104 may be rotatably secured to a handle 204 via one or more rotatable mounts. In one or more embodiments, a rotatable mount may comprise a pivot 152. As shown in FIG. 1 for example, a pivot 152 extends between one or more portions 184 of the handle 204 and through a hub 114 of the blade 108 to allow the blade to rotate at the pivot. It is noted that in FIG. 1, the pivot 152 extends through and is secured by one or more corresponding apertures 156 in the handle 204. One or more blade spacers 136 may be provided to facilitate rotation of the blade 108.

As stated above, the second end 116 of a blade 108 will typically comprise a shaped peripheral edge 196. The shaped peripheral edge 196 facilitates locking of the blade. In one or more embodiments, a shaped peripheral edge 196, or a portion thereof, will engage and disengage a locking bar 120 to lock or unlock a blade 108.

A shaped peripheral edge 196 may also comprise structural features that limit the extent to which a blade 108 may be extended, folded, or both. As will be described further below, a shaped peripheral edge 196 may engage an extension stop 180, a folding stop 144, or both, thereby preventing further extension or folding, respectively speaking. In one or more embodiments, an extension stop 180, folding stop 144, or both may be secured to one or more portions 184 of a handle 204, such as at one or more corresponding apertures 192, 164 thereof.

A locking bar 120 may comprise one or more guides 124 that, together with one or more mating guides 148, guide the movement of the locking bar. As shown in FIG. 1, the mating guide 148 is in the form of a pin that engages the guide 124, which is in the form of a slot, to control lateral movement of the locking bar 120. In the embodiment of FIG. 1, the mating guide 148 is secured to one or more portions 184 of the handle 204 at one or more corresponding apertures 168 thereof.

As stated, a locking bar 120 will typically be slidably mounted, such as within a handle 204 of a locking foldable knife 104. As can be seen in FIGS. 1 and 2, a handle spacer 188 provides lateral separation of the portions 184 of the handle 204, forming a compartment in the handle within which the locking bar 120 can slide. A user engagement portion 128, which may be textured, of the locking bar 120 is externally accessible to allow a user to engage and change the position of the locking bar.

A locking bar 120 will typically also comprise one or more biasing devices 132 to bias the locking bar toward a particular position, or both. As can be seen in FIG. 1, a biasing device 132 may comprise a spring or the like, which may be housed in a section, such as a cavity 194, of a locking bar 120. An anchor 172 may be provided to secure an end or other portion of a biasing device 132, thereby allowing the biasing device to apply a force relative to its secured portion.

As shown in FIG. 1, an anchor 172 secures a portion of the biasing device 132 to one or more portions 184 of a handle 204. In the embodiment of FIG. 1, the anchor 172 is a pin that is secured at one or more corresponding apertures 176 of one or more portions 184 of the handle 204. In one or more embodiments, the biasing device 132 applies a force that forces the locking bar 120 toward the blade 108, which biases the locking bar to an extended position.

Figure 4:
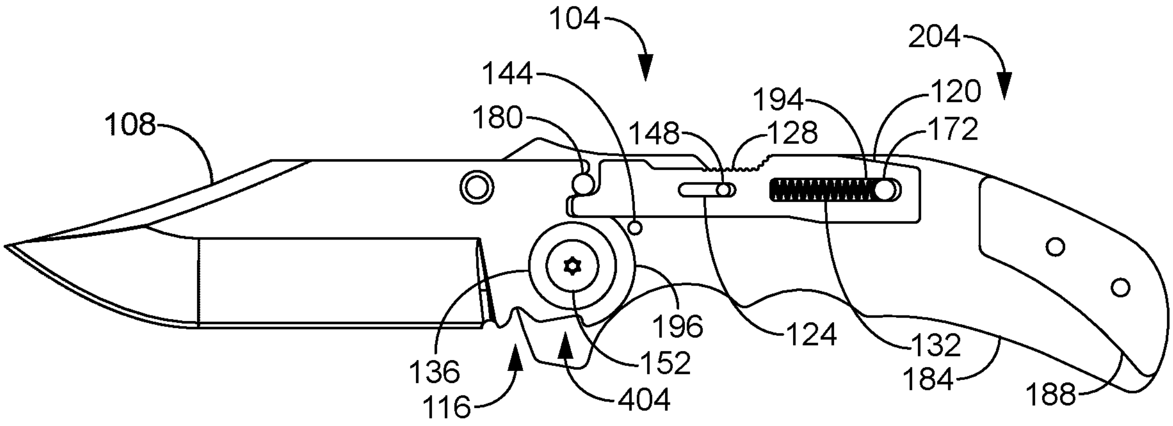
FIG. 4 is a side cross-sectional view of an exemplary locking foldable knife in a locked state.
Figure 5:
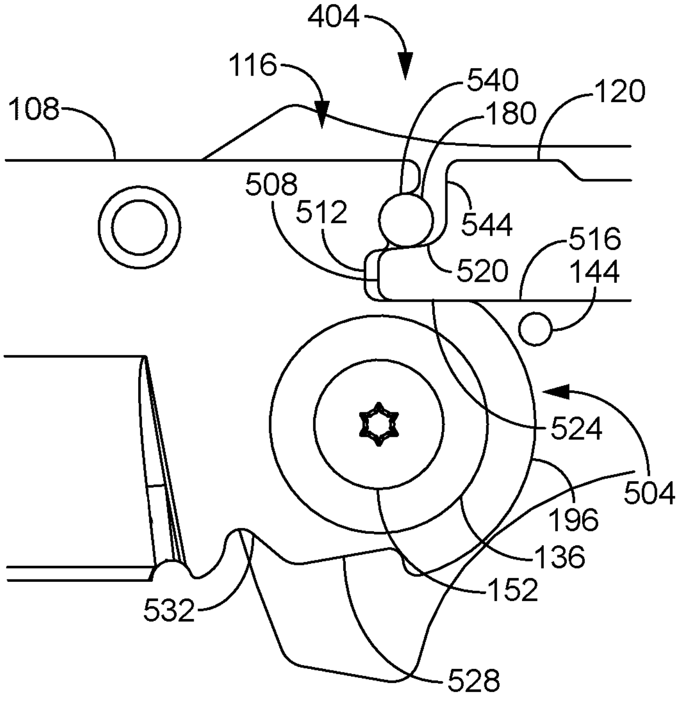
FIG. 5 is a side cross-sectional view of an exemplary locking assembly.
Figure 6:
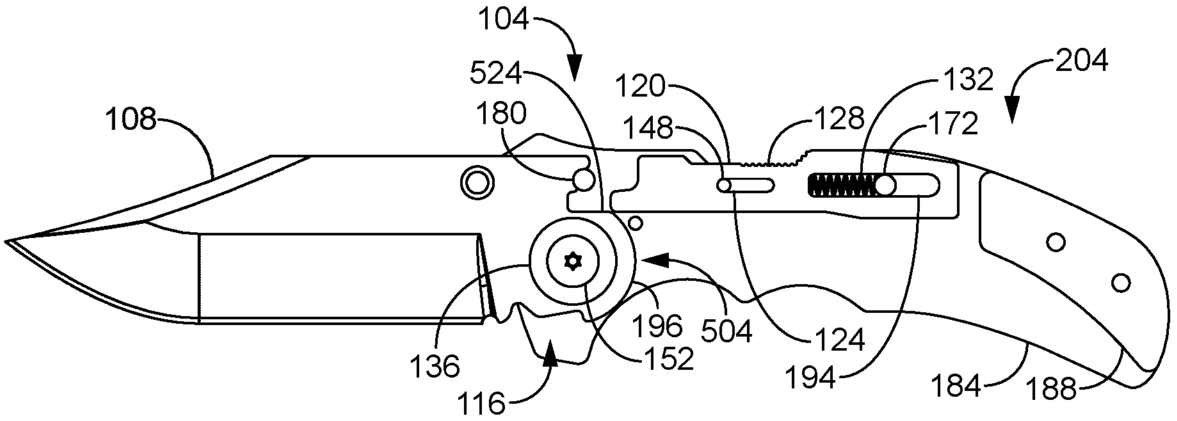
FIG. 6 is a side cross-sectional view of an exemplary locking foldable knife in an unlocked state.
Figure 7:
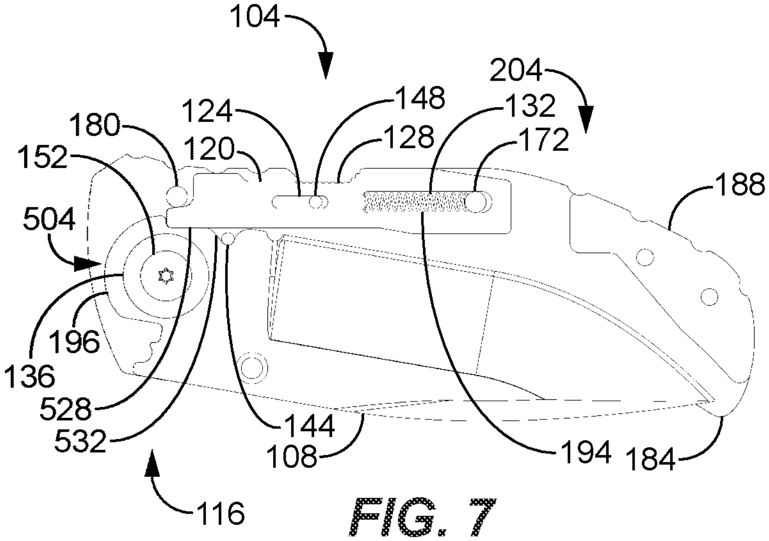
FIG. 7 is a side cross-sectional view of an exemplary locking foldable knife in a locked state.

Operation of a locking foldable knife 104 will now be described with respect to FIGS. 4-7, whereby FIGS. 4 and 5 illustrate the locking foldable knife 104 in a locked state while in an extended state, FIG. 6 illustrates the locking foldable knife in an unlocked state while in an extended state, and FIG. 7 illustrates the locking foldable knife in a locked stated while being folded. In the illustrated unlocked state of FIG. 6, the blade 108 is shown in an extended position; however, it will be understood from the disclosure herein that a locking foldable knife 104 may be unlocked while in its folded state to allow transition to an extended state.

A detailed view of the exemplary locking assembly 404 is shown in FIG. 5. As can be seen, the shaped peripheral edge 196 of a blade 108 may comprise one or more locking edges 524, 528, one or more interstitial edges 504, or both. In one or more embodiments, an interstitial edge 504 will be formed between two locking edges 524, 528. In general, a locking bar 120 will traverse an interstitial edge 504 as the locking foldable knife 104 is placed in its extended or folded states. One or more receiving edges 532, 540 may be provided as well to engage an extension stop 180, folding stop 144, or both to limit the extent of extension and folding that can occur.

A locking edge 524, 528 engages a locking bar 120 to lock a blade 108 in position, such as shown in FIGS. 4 and 5. In one or more embodiments, a locking edge 524, 528 may be shaped to conform to the locking edge 516 of a locking bar 120. These mating surface areas allow the blade 108 to be robustly locked in position with little or no movement once locked.

As can be seen, an interstitial edge 504 may be arcuate while one or more locking edges are substantially linear.

An outward extending tab 508 and corresponding slot 512 that receives the tab may be provided to further the reliability of the lock. A tab 508 and slot 512 may, respectively, be at a second end 116 of a blade 108 and a locking bar 120, or vice versa. As shown in FIG. 5 for example, a slot 512 is formed in the shaped peripheral edge 196 of the blade 108 at the second end 116 thereof, and a corresponding tab 508 is provided at a distal end 544 of the locking bar 120.

When locked, a tab 508 may be received in a slot 512 further adding to the surface area of engagement between a blade 108 and locking bar 120, increasing the robustness of the lock. The increased strength of the lock reduces the likelihood of lock failure, such as due to force applied on the blade 108 during use. As can be seen, a tab 508 and slot 512 may have conforming shapes to increase the surface area of engagement.

It is noted that a locking bar 120 may engage an extension stop 180 when extended. In one or more embodiments, this engagement limits the extension of the locking bar 120 and may be used to prevent a tab 508 or other portion of the locking bar from advancing into a slot 512 beyond a particular threshold. The locking bar 120 may be prevented from becoming lodged in the slot 512 in this manner.

FIGS. 4 and 5 also show that an extension stop 180 prevents the locking bar 120 from moving perpendicularly to the locking bar's longitudinal axis by engaging at least the distal end 544 of the locking bar when the locking bar is extended into a locked position. A portion 520 of the locking bar 120, namely its tab 508, may be received between an extension stop 180 and a locking edge 524, 528 of the blade 108, when locked. In this manner, the locking bar 120 is prevented from moving perpendicularly to its longitudinal axis and the blade 108 accordingly cannot be folded unless the locking bar 120 is retracted.

In FIG. 4, the locking bar 120 is in an extended position thereby locking the blade 108 in the extended state shown therein. The biasing device 132 applies a force to maintain the extended position of the locking bar 120. The force applied by a biasing device 132 may be overcome by a user to retract the locking bar 120. For example, in FIG. 6, the locking bar 120 is retracted to unlock the blade 108, compressing the biasing device 132.

When retracted, the locking bar 120 is disengaged from the locking edge 524, which unlocks the blade 108 and allows the blade to be rotated. The locking bar 120 may traverse the interstitial edge 504, in engagement or adjacent with the interstitial edge, as the blade 108 is rotated, such as to arrive at another locking edge 528 thereby locking the blade in a folded state, as shown in FIG. 7.

As can be seen, a locking bar 120 may be retracted to unlock the blade 108, to allow the blade 108 to move between the extended state and folded state. The locking bar 120 may then be extended to lock the blade 108 in the desired state.

Figure 8:
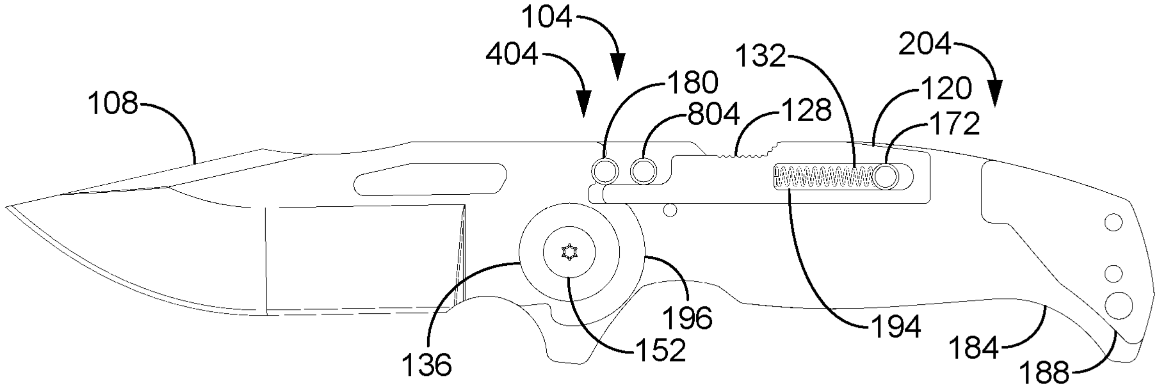
FIG. 8 is a side cross-sectional view of an exemplary locking foldable knife.

FIG. 8 illustrates an embodiment of a locking foldable knife 104 having a locking assembly 404 with an additional stop 804. An additional stop 804 reinforces the locking assembly 404 by providing additional structure to prevent the locking bar 120 from moving perpendicularly to its longitudinal axis, which reduces the likelihood of the blade 108 folding while locked. Similar to an extension stop 180, the additional stop 804 may engage a locking bar 120 when the locking bar is extended, limiting the extension of the locking bar.

Figure 9:
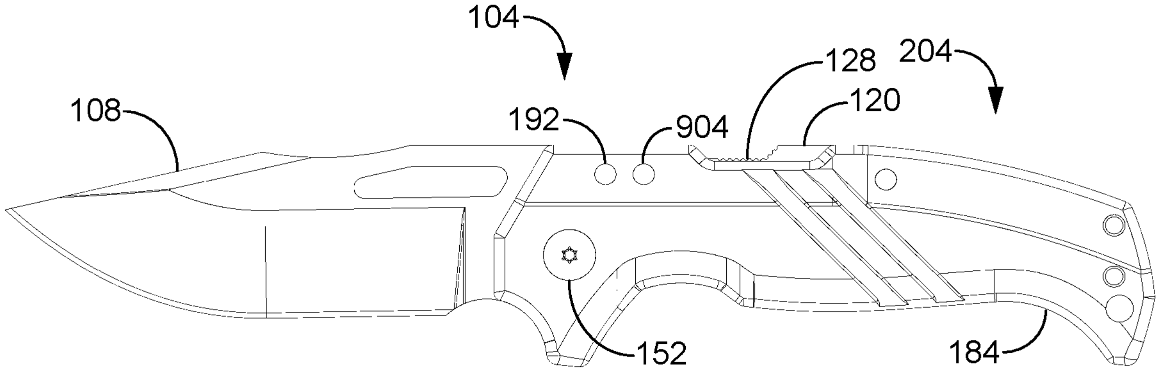
FIG. 9 is a side view of an exemplary locking foldable knife.

FIG. 9 illustrates a side view of such embodiment. As can be seen, an additional stop 804 may be secured to one or more apertures 904 of one or more portions 184 of a locking foldable knife's handle 204.

Figure 10:
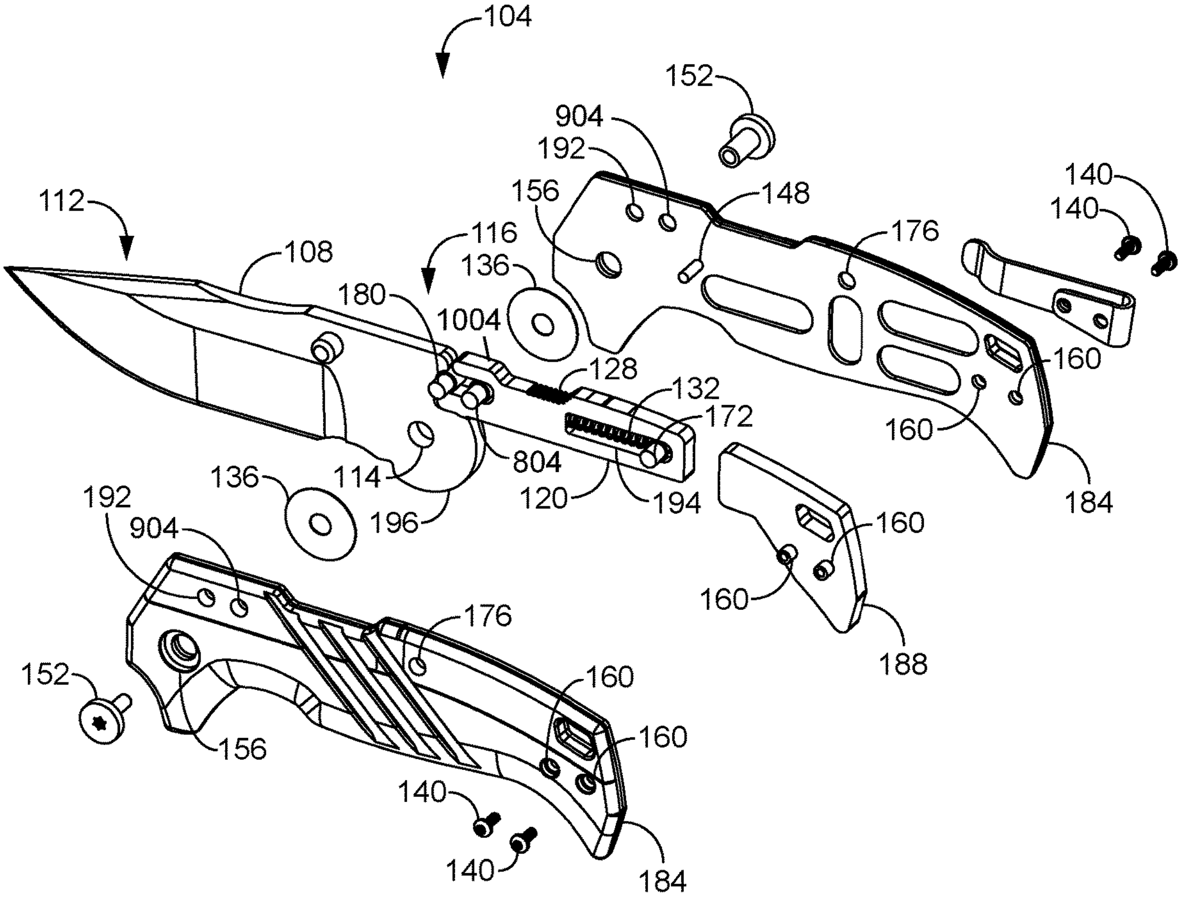
FIG. 10 is an exploded view of an exemplary locking foldable knife.
Figure 11:
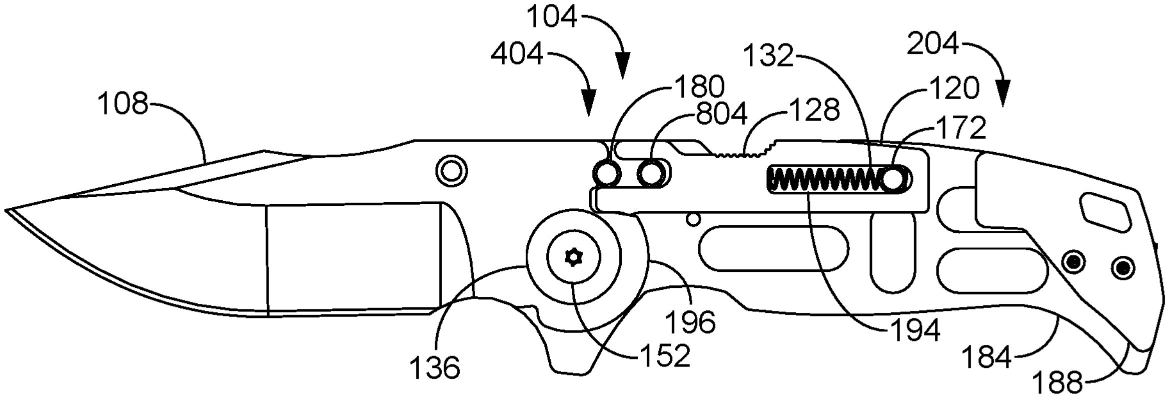
FIG. 11 is a side cross-sectional view of an exemplary locking foldable knife in an unlocked state.
Figure 12:
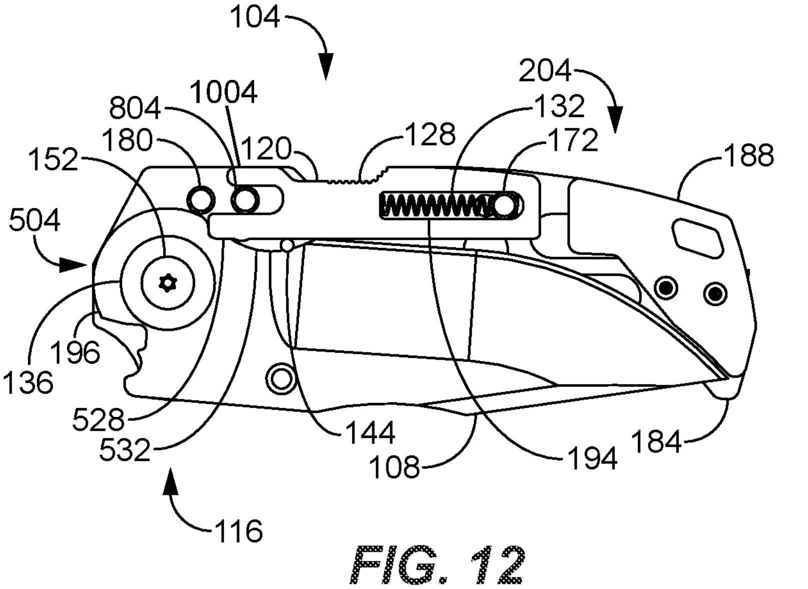
FIG. 12 is a side cross-sectional view of an exemplary locking foldable knife in a locked state.

FIGS. 10-14 illustrate an embodiment of a locking foldable knife 104 having a locking assembly 404 with an additional stop 804 as well as an additional tab 1004. It is noted that various combinations of one or more stops 180, 804 and one or more tabs 508, 1004 may be provided in different embodiments of the locking foldable knife 104. FIGS. 11 and 12 illustrate the locking foldable knife 104 in a locked state, with FIG. 11 illustrating an extended state and FIG. 12 illustrating a folded state.

Similar to an additional stop, an additional tab 1004 reinforces the locking assembly 404 by providing additional structure to prevent lock failure. As can be seen in FIG. 10, the additional tab 1004 may engage a proximal portion of a blade 108, one or more stops 180, 804, or both to further prevent the blade from becoming overextended.

Figure 13:
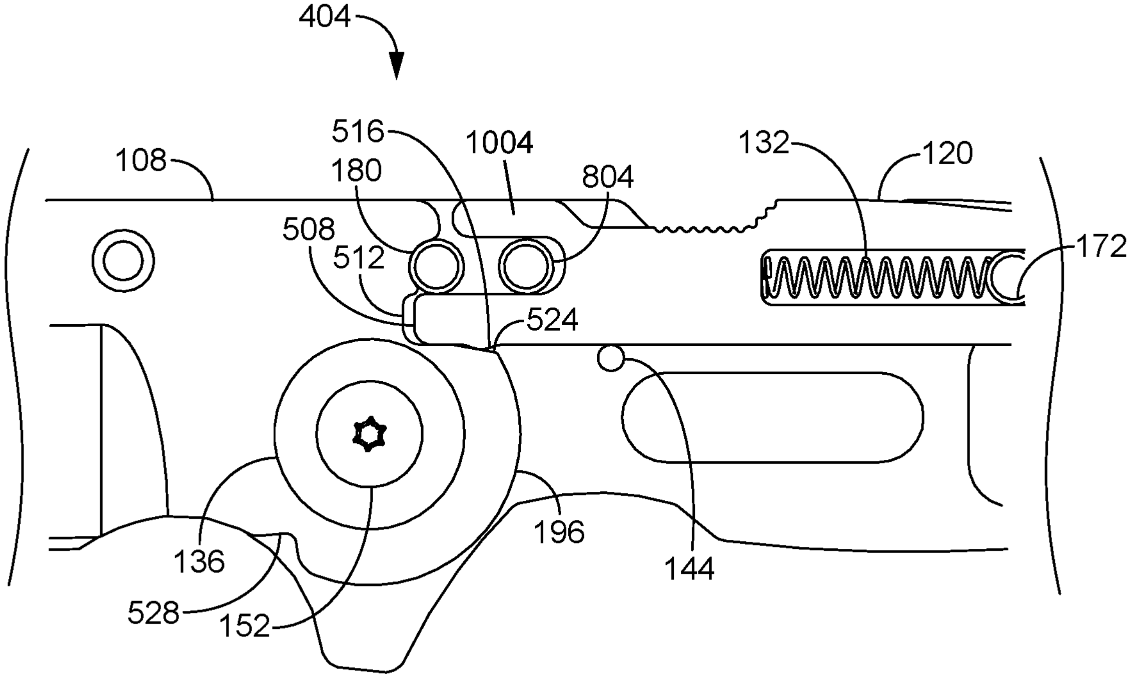
FIG. 13 is a side cross-sectional view of an exemplary locking assembly.
Figure 14:
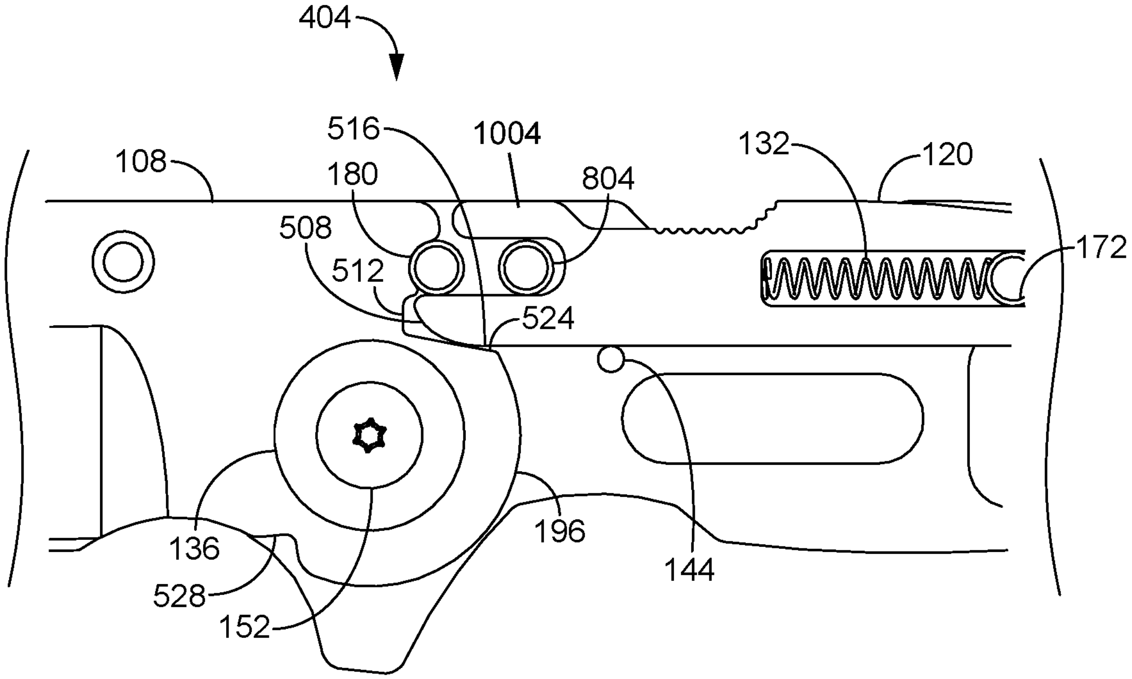
FIG. 14 is a side cross-sectional view of an exemplary locking assembly.

It is noted that a locking bar 120, a shaped peripheral edge 196, or both may have various shapes. As shown in the detail views of FIGS. 13 and 14 for example, a locking edge 516 of a locking bar 120 may comprise one or more contoured portions. FIG. 13 illustrates an exemplary embodiment having an outwardly extending protrusion in the locking edge 516, while FIG. 14 illustrates an exemplary embodiment having a curved locking edge. A locking edge 524 of a shaped peripheral edge 196 may be shaped to accommodate the same. As can be seen in FIGS. 13 and 14, a locking edge 524 of a shaped peripheral edge 196 may be angled to engage a locking edge 516 of a locking bar 120.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

The invention claimed is:

1. A knife comprising:

a handle;

a first stop disposed on the handle;

a blade mounted to the handle and being rotatable between folded and unfolded states relative to the handle, the blade defining an unfolded locking edge; and a locking bar disposed on the handle and being slidable between extended and retracted positions along an axis relative to the first stop, the locking bar having first and second edges opposing one another along the axis, the first edge of the locking bar in the extended position being configured to engage the unfolded locking edge of the blade in the unfolded state, the second edge of the locking bar in the extended position being configured to engage the first stop at least with the blade in the unfolded state, wherein at least one of: the second edge of the locking bar in the extended position is configured to engage the first stop with the blade in the folded state; and the second edge of the locking bar in the retracted position is configured to disengage from the first stop.

2. The knife of claim 1, wherein the blade in the unfolded state is configured to engage the first stop.

3. The knife of claim 2, wherein:

the first stop has first and second sides;

the blade defines an unfolded receiving edge, the unfolded receiving edge on the blade in the unfolded state is configured to engage the second side of the first stop; and the second edge of the locking bar in the extended position is configured to engage the first side of the first stop at least with the blade in the unfolded state.

4. The knife of claim 1, further comprising a second stop disposed on the handle and aligned with the first stop along the axis, wherein the second edge of the locking bar in the extended and retracted positions is configured to engage the second stop.

5. The knife of claim 4, wherein the locking bar comprises a tab extending adjacent to the second edge, the second stop being positioned between the second edge and the tab of the locking bar.

6. The knife of claim 1, further comprising at least one guide disposed on the handle, the at least one guide being configured to guide the locking bar along the axis between the extended and retracted positions, wherein the locking bar defines a cavity along the axis; wherein the at least one guide is disposed in the cavity; and wherein the locking bar comprises a spring disposed therein between an inner edge of the cavity and the at least one guide, the spring biasing the locking bar toward the extended position.

7. A knife comprising:

a handle;

a first stop disposed on the handle, the first stop having first and second sides;

a blade mounted to the handle and being rotatable between folded and unfolded states relative to the handle, the blade defining an unfolded locking edge and an unfolded receiving edge, the unfolded receiving edge on the blade in the unfolded state being configured to engage the second side of the first stop; and a locking bar disposed on the handle and being slidable between extended and retracted positions along an axis relative to the first stop, the locking bar having first and second edges opposing one another along the axis, the first edge of the locking bar in the extended position being configured to engage the unfolded locking edge of the blade in the unfolded state, the second edge of the locking bar in the extended position being configured to engage the first side of the first stop at least with the blade in the unfolded state, wherein the blade defines a slot disposed between the unfolded receiving edge and the unfolded locking edge; and wherein a distal end of the locking bar in the extended position is configured to position at least partially in the slot of the blade in the unfolded state.

8. A knife comprising:

a handle;

a first stop disposed on the handle;

a blade mounted to the handle and being rotatable between folded and unfolded states relative to the handle, the blade defining an unfolded locking edge; and a locking bar disposed on the handle and being slidable between extended and retracted positions along an axis relative to the first stop, the locking bar having first and second edges opposing one another along the axis, the first edge of the locking bar in the extended position being configured to engage the unfolded locking edge of the blade in the unfolded state, the second edge of the locking bar in the extended position being configured to engage the first stop at least with the blade in the unfolded state, wherein the blade defines a folded locking edge; and wherein the first edge of the locking bar in the extended position is configured to engage the folded locking edge of the blade in the folded state.

9. The knife of claim 8, wherein the first edge of the locking bar in the retracted position is configured to disengage from the folded and unfolded locking edges.

10. The knife of claim 8, wherein the second edge of the locking bar in the extended position is configured to engage the first stop such that a distal end of the locking bar is configured to position between the first stop and the folded locking edge of the blade in the folded state.

11. The knife of claim 8, wherein the folded locking edge defines a first locking surface and a second locking surface, the second locking surface oriented transverse to the first locking surface; wherein the first edge of the locking bar in the extended position is configured to engage the first locking surface of the blade in the folded state; and wherein a distal end of the locking bar in the extended position is configured to engage the second locking surface of the blade in the folded state.

12. A knife, comprising:
a handle;
a first stop disposed on the handle;
a blade mounted to the handle and being rotatable between folded and unfolded states relative to the handle, the blade defining an unfolded locking edge; and
a locking bar disposed on the handle and being slidable between extended and retracted positions along an axis relative to the first stop, the locking bar having first and second edges opposing one another along the axis, the first edge of the locking bar in the extended position being configured to engage the unfolded locking edge of the blade in the unfolded state, the second edge of the locking bar in the extended position being configured to engage the first stop at least with the blade in the unfolded state; and
a second stop disposed on the handle, wherein the blade defines a folded receiving edge, the folded receiving edge on the blade in the folded state being configured to engage the second stop.

13. A knife comprising:
a handle;
a first stop disposed on the handle and having first and second sides;
a second stop disposed on the handle;
a locking bar disposed on the handle and being slidable between extended and retracted positions along an axis relative to the first stop, the locking bar having first and second edges opposing one another along the axis; and
a blade having first and second ends, the blade being mounted at the second end to the handle and being rotatable between folded and unfolded states relative to the handle, the second end defining a folded receiving edge, an unfolded receiving edge, a folded locking edge, and an unfolded locking edge,
the folded locking edge on the blade in the folded state being configured to engage the first edge of the locking bar in the extended position,
the folded receiving edge on the blade in the folded state being configured to engage the second stop,
the unfolded receiving edge on the blade in the unfolded state being configured to engage the second side of the first stop,
the unfolded locking edge on the blade in the unfolded state being configured to engage the first edge on the locking bar in the extended position,
the second edge of the locking bar in the extended position being configured to engage the first side of the first stop,
the first edge of the locking bar in the retracted position being configured to disengage from the folded and unfolded locking edges.

14. The knife of claim 13, wherein the second edge of the locking bar in the retracted position is configured to disengage from the first side of the first stop.

15. The knife of claim 13, wherein the second end of the blade defines a slot disposed between the unfolded receiving edge and the unfolded locking edge; and wherein a distal end of the locking bar in the extended position is configured to position at least partially in the slot of the blade in the unfolded state.

16. The knife of claim 13, further comprising a third stop disposed on the handle and aligned with the first stop along the axis, wherein the second edge of the locking bar in the extended and retracted positions is configured to engage the third stop.

17. The knife of claim 16, wherein the locking bar comprises a tab extending adjacent to the second edge, the third stop being positioned between the second edge and the tab of the locking bar.

18. The knife of claim 13, further comprising at least one guide disposed on the handle, the at least one guide being configured to guide the locking bar along the axis between the extended and retracted positions; wherein the locking bar defines a cavity along the axis; wherein the at least one guide is disposed in the cavity; and wherein the locking bar comprises a spring disposed therein between an inner edge of the cavity and the at least one guide, the spring biasing the locking bar toward the extended position.

19. A knife comprising:
a handle;
a first stop disposed on the handle;
a blade having a proximal end rotatably mounted to the handle, the blade being rotatable in an unfolding direction from a folded state to an unfolded state relative to the handle, the blade being rotatable in a folding direction from the unfolded state to the folded state relative to the handle, the proximal end defining a first locking edge facing the folding direction; and
a locking bar disposed on the handle and being movable between an extended position and a retracted position relative to the first stop and the proximal end of the blade, the locking bar having first and second edges opposing one another, the first edge opposing the folding direction, the second edge opposing the unfolding direction,
the first edge of the locking bar in the extended position being configured to engage the first locking edge when the blade is in the unfolded state,
the second edge of the locking bar in the extended position being configured to engage the first stop when the blade is in the unfolded state,
the first edge of the locking bar in the retracted position being configured to disengage from the first locking edge when the blade is in the unfolded state.

20. The knife of claim 19, wherein at least one of:
the second edge of the locking bar in the extended position is configured to engage the first stop when the blade is in the folded state; and
the second edge of the locking bar in the retracted position is configured to disengage from the first stop.

21. The knife of claim 19, wherein the proximal end of the blade defines a receiving edge facing the unfolding direction, the receiving edge being configured to engage the first stop in response to the blade rotated in the unfolding direction to the unfolded state.

22. The knife of claim 19, wherein the proximal end of the blade defines a slot disposed adjacent to the first locking edge; and wherein a distal end of the locking bar in the extended position is configured to position at least partially in the slot of the blade.

23. The knife of claim 19, wherein the proximal end of the blade defines a second locking edge facing the unfolding direction; and wherein the locking bar in the extended position is configured to engage the second locking edge when the blade is in the folded state.

24. The knife of claim 23, wherein the second locking edge has a first portion facing the unfolding direction and has a second portion facing the folding direction; wherein a distal end of the locking bar in the extended position is configured to engage the first portion of the second locking edge when the blade is in the folded state; and wherein the first edge of the locking bar in the extended position is configured to engage the second portion of the second locking edge when the blade is in the folded state.

25. The knife of claim 24, wherein the locking bar in the retracted position is configured to disengage from at least the first portion of the second locking edge when the blade is in the folded state.

26. The knife of claim 23, wherein the second edge of the locking bar in the extended position is configured to engage the first stop, whereby the first and second edges of the locking bar are configured to position between the first stop and the second locking edge when the blade is the folded state.

27. The knife of claim 19, further comprising a second stop disposed on the handle, wherein the blade defines a receiving edge facing the folding direction, the receiving edge being configured to engage the second stop in response to the blade rotated in the folding direction to the folded state.

28. The knife of claim 19, further comprising at least one guide disposed on the handle, the at least one guide being configured to guide the locking bar between the extended position and the retracted position, wherein the locking bar defines a cavity; wherein the at least one guide is disposed in the cavity; and wherein the locking bar comprises a spring disposed therein between an inner edge of the cavity and the at least one guide, the spring biasing the locking bar toward the extended position.

* * * * *